Patented Feb. 12, 1952

2,585,531

UNITED STATES PATENT OFFICE 2,585,531

BALL POINT PEN INK

Sandor Bernfeld, Bernard Bomse, and Sylvain Scharfspitz, New York, N. Y.

No Drawing. Application December 16, 1949, Serial No. 133,496

2 Claims. (Cl. 106—27)

This invention relates to a liquid cream perfumed ink for ball point pens.

In recent years the ball point pen has attained great favor as a writing instrument, but the cream inks generally used in such ball point pens have such an offensive odor that the popularity of such pens is slowly waning due to that offensive odor which is known to cause nausea in some persons.

The present invention proposes an improved ink for ball point pens which is perfumed giving it a pleasant odor which will not be offensive to the user and which has all of the properties of permanence found in the cream inks now generally used in ball point pens.

Another object of the present invention proposes a perfumed cream ink for ball point pens which may be made in a variety of different colors by changing the coloring matter used in the basic formula.

Still further the present invention proposes an improved perfumed ink for ball point pens which is compounded of water, stearin, glycerine, triethanolamine, alcohol, lanolin, tolu balsam, muscone, ambrette, patchouli, cholesterol, Styrax gum and aniline coloring matter in such proportions that an ink is obtained which will readily flow from conventional ball point pens during writing, which will have an affinity for all papers, cloth, wood and other surfaces upon which it might be desired to write.

It is a further object of the present invention to vary the formula in a manner to produce an ink which will have usual drying qualities or to produce an ink which will have quick drying qualities.

For further comprehension of the invention, and of the objects and advantages thereof, reference will be had to the following description and to the appended claims in which the various novel features of the invention are more particularly set forth.

The improved liquid cream perfumed ink for ball point pens, according to the present invention, is compounded of the following ingredients:

Water
Stearin ($C_{57}H_{110}O_6$)
Glycerine (36% solution)
Triethanolamine ($C_6H_{15}NO_3$)
Alcohol (96% solution)
Lanolin
Tolu balsam
Muscone ($C_{16}H_{30}O$)
Ambrette (musk seed)
Patchouli (Perfume essence)
Cholesterol ($C_{27}H_{45}OH$)
Styrax gum
Aniline coloring (a. blue, a. brown, a. red or the like).

The cream ink resulting from the mixture of the above ingredients has an odor which is pleasing and yet the ink will have all of the features of permanence desired in such an ink.

Example I

In accordance with one method of carrying out the process of the present invention, there is produced an ink for ball point pens having usual drying qualities by mixing together in a suitable receptacle the following ingredients:

5000 grams of water
50 grams of stearin
50 grams of glycerine (36% solution)
100 grams of triethanolamine To insure thorough intermixing of the above ingredients they are brought to a rapid boil for a period of one mintue and then allowed to cool.

There is mixed together in another receptacle the following ingredients:

1000 grams of alcohol (96% solution)
100 grams of lanolin
20 grams of tolu balsam
30 grams of muscone
50 grams of ambrette
50 grams of patchouli
2 grams of cholesterol
50 grams of Styrax gum
400 grams of aniline coloring (a. blue, a. brown, a. red or the like).

The ingredients are placed in the receptacle in the order set forth and then the entire contents are placed in a hot bath with gentle stirring until all of the contents are thoroughly dissolved, which takes about one-half hour. Solution two is then poured, while still hot from the hot bath, into solution one and the two solutions are thoroughly mixed together and then allowed to cool. The resulting ink is then ready to be used in ball point pens.

It is appreciated of course, that the aniline coloring is selected in accordance with the color of the ink that it is desired to produce.

Example II

There is mixed together in a suitable receptacle, the following ingredients:

4800 grams of water
50 grams of stearin 50 grams of glycerine (36% solution)
100 grams of triethanolamine.

To insure thorough intermixing of the above ingredients they are brought to a rapid boil for a period of one minute and then allowed to cool.

There is mixed together in another receptacle the following ingredients:

1200 grams of alcohol (96% solution)
100 grams of lanolin
20 grams of tolu balsam
30 grams of muscone
50 grams of ambrette
50 grams of patchouli
2 grams of cholesterol
50 grams of Styrax gum
400 grams of aniline coloring (a. blue, a. brown, a. red or the like).

The ingredients of receptacle two are placed in that receptacle in the order set forth and then the entire contents are placed in a hot bath with gentle stirring until all of the contents are thoroughly dissolved, which takes about one-half hour. The contents of the second receptacle, while still hot from the hot bath, is then poured into the contents of the first receptacle and the solution are then thoroughly mixed together and allowed to cool. The resulting ink is then ready to be used in a ball point pen and will have quicker drying qualities than the ink produced in accordance with Example I.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. A perfumed ink for ball point pens, comprising 5000 grams of water, 50 grams of stearin, 50 grams of glycerine, 100 grams of triethanolamine, 1000 grams of alcohol, 100 grams of lanolin, 20 grams of tolu balsam, 30 grams of muscone, 50 grams of ambrette, 50 grams of patchouli, 2 grams of cholesterol, 50 grams of Styrax gum and 400 grams of aniline coloring matter.

2. A perfumed ink for ball point pens, comprising water in an amount of from 4800 to 5000 grams, alcohol in an amount to make the combined weight of the water 6000 grams, 50 grams of stearin
50 grams of glycerin
100 grams of triethanolamine
100 grams of lanolin
20 grams of tolu balsam
30 grams of muscone
50 grams of ambrette
50 grams of patchouli
2 grams of cholesterol
50 grams of Styrax gum and
400 grams of aniline coloring matter.

SANDOR BERNFELD.
BERNARD BOMSE.
SYLVAIN SCHARFSPITZ.

REFERENCES CITED

The following references are of record in the file of this patent:

UNITED STATES PATENTS

| Number | Name | Date |
|---|---|---|
| 437,780 | Higgins | Oct. 7, 1890 |
| 671,972 | Millison | Apr. 16, 1901 |
| 970,439 | Fuerth | Sept. 13, 1910 |
| 993,348 | Collinson | May 30, 1911 |

FOREIGN PATENTS

| Number | Country | Date |
|---|---|---|
| 23,852 | Great Britain | 1909 |
| 512,218 | Great Britain | Aug. 30, 1939 |

OTHER REFERENCES

Lindsly et al., Chemical Industries, July 1948, pp. 50 and 57.